United States Patent
Blin et al.

(10) Patent No.: US 7,191,282 B2
(45) Date of Patent: Mar. 13, 2007

(54) DATA PROCESSING APPARATUS AND METHOD FOR DETERMINING THE AMOUNT OF FREE STORAGE SPACE IN SUCH AN APPARATUS

(75) Inventors: Georges Emmanuel Blin, Saint-Hubert (CA); Le Huan Tran, Pointe-Claire (CA)

(73) Assignee: Autodesk Canada Co., Montreal (CA)

( * ) Notice: Subject to any disclaimer, the term of this patent is extended or adjusted under 35 U.S.C. 154(b) by 317 days.

(21) Appl. No.: 10/623,946

(22) Filed: Jul. 21, 2003

(65) Prior Publication Data

US 2004/0057200 A1     Mar. 25, 2004

(30) Foreign Application Priority Data

Jul. 19, 2002   (GB) ................... 0216825.0

(51) Int. Cl.
*G06F 12/00* (2006.01)
(52) U.S. Cl. ................... 711/114; 711/711; 711/173
(58) Field of Classification Search ............... None
See application file for complete search history.

(56) References Cited

U.S. PATENT DOCUMENTS

| 5,287,500 | A  | * | 2/1994 | Stoppani, Jr. ............... 711/211 |
| 5,390,315 | A  | * | 2/1995 | Blandy et al. .............. 711/112 |
| 6,023,744 | A  | * | 2/2000 | Shoroff et al. ............. 711/4 |
| 6,118,931 | A  |   | 9/2000 | Bopardikar |
| 6,175,900 | B1 | * | 1/2001 | Forin et al. ................. 711/156 |
| 6,404,975 | B1 | * | 6/2002 | Bopardikar et al. ......... 386/46 |
| 6,510,505 | B1 | * | 1/2003 | Burns et al. ................. 711/170 |
| 6,636,879 | B1 | * | 10/2003 | Doucette et al. ............ 707/205 |
| 6,820,122 | B1 | * | 11/2004 | Mandler et al. ............ 709/226 |

FOREIGN PATENT DOCUMENTS

| EP | 0701370 A1 | 3/1996 |
| GB | 2312059 A  | 10/1997 |

OTHER PUBLICATIONS

"Operating Systems Internals and Design Principles", William Stallings, 2001, Prentice-Hall, Inc. 4th Edition, pp. 549-550.*
"Microsoft Computer Dictionary", 2002, Microsoft Press, 5th Edition, pp. 61 and 81.*
"stone disk arrays—Designed for guaranteed high performance and creative flexibility", Jul. 2001; accessed at <http://images.autodesk.com/adsk/files/stoneDiskArrays.pdf>.*
Storage: Configuration Guide for SGI Workstations, First Edition, www.discreet.com, Jul. 26, 2002, pp. 1-134.
Stone 1000/2000: Configuration Guide for SGI Workstations, First Edition, www.discreet.com, Jul. 11, 2002, pp. 1-68.

* cited by examiner

*Primary Examiner*—Brian R. Peugh
(74) *Attorney, Agent, or Firm*—Gates & Cooper LLP (57) ABSTRACT

A data processing apparatus, comprising data storage having a plurality of defined storage elements, memory containing usage data indicating which of the storage elements contains data, and a processor is configured to update the usage data in response to data being stored within the data storage. The memory contains a datastore. The processor is configured to analyze the usage data to determine the number of the storage elements not containing data, store information within the datastore indicating the number of storage elements not containing data and read information from the data storage to determine whether the further data may be stored.

31 Claims, 11 Drawing Sheets

| A8 | A9 | A10 | A11 | A12 | A13 |    |    |
|----|----|-----|-----|-----|-----|----|----|
| A0 | A1 | A2  | A3  | A4  | A5  | A6 | A7 |

502

| B6 | B7 | B8 | B9 |    |    |
|----|----|----|----|----|----|
| B0 | B1 | B2 | B3 | B4 | B5 |

503

| C12 | C13 | C14 | C15 | C16 | C17 | C18 |    |    |    |     |     |
|-----|-----|-----|-----|-----|-----|-----|----|----|----|-----|-----|
| C0  | C1  | C2  | C3  | C4  | C5  | C6  | C7 | C8 | C9 | C10 | C11 |

| FRAME SIZE # 1 | No OF FREE STORAGE ELEMENTS |
|---|---|← 701

| FRAME SIZE # 2 | No OF FREE STORAGE ELEMENTS |
|---|---|← 702

| FRAME SIZE # 3 | No OF FREE STORAGE ELEMENTS |
|---|---|← 703

| FRAME SIZE # 4 | No OF FREE STORAGE ELEMENTS |
|---|---|← 704

| FRAME SIZE # 5 | No OF FREE STORAGE ELEMENTS |
|---|---|← 705

| FRAME SIZE # 6 | No OF FREE STORAGE ELEMENTS |
|---|---|← 706

| FRAME SIZE # 7 | No OF FREE STORAGE ELEMENTS |
|---|---|← 707

| FRAME SIZE # 8 | No OF FREE STORAGE ELEMENTS |
|---|---|← 708

DATA PROCESSING APPARATUS AND METHOD FOR DETERMINING THE AMOUNT OF FREE STORAGE SPACE IN SUCH AN APPARATUS

CROSS-REFERENCE TO RELATED APPLICATIONS

This application claims the benefit under 35 U.S.C. §119 of the following co-pending and commonly assigned foreign patent application, which application is incorporated by reference herein:

United Kingdom Patent Application No. 02 16 825.0, entitled "DATA PROCESSING APPARATUS", filed on Jul. 19, 2002.

BACKGROUND OF THE INVENTION

1. Field of the Invention

The present invention relates to data processing apparatus and a method of processing data.

2. Description of the Related Art

Data processing systems for editing and manipulating large amounts of data, for example image clips, have been known for a number of years. Such systems contain large data storage devices, typically in the form of a RAID (redundant array of independent disks).

A particular piece of data may be very large, for example a clip which is to be used in an editing process may comprise many megabytes of data. Therefore, if an attempt is made to load such data onto a RAID, and the available storage space on the RAID is insufficient, processing time and operator time is wasted. It is therefore known for systems to have a process for measuring the available storage space before the storage process is commenced. However, such measuring processes themselves require a substantial processing effort, and the corresponding processing time can impact on the workflow of the human operator.

DETAILED DESCRIPTION OF THE INVENTION

An embodiment of the invention will now be described by way of example only with reference to the previously identified drawings.

Figure 1:
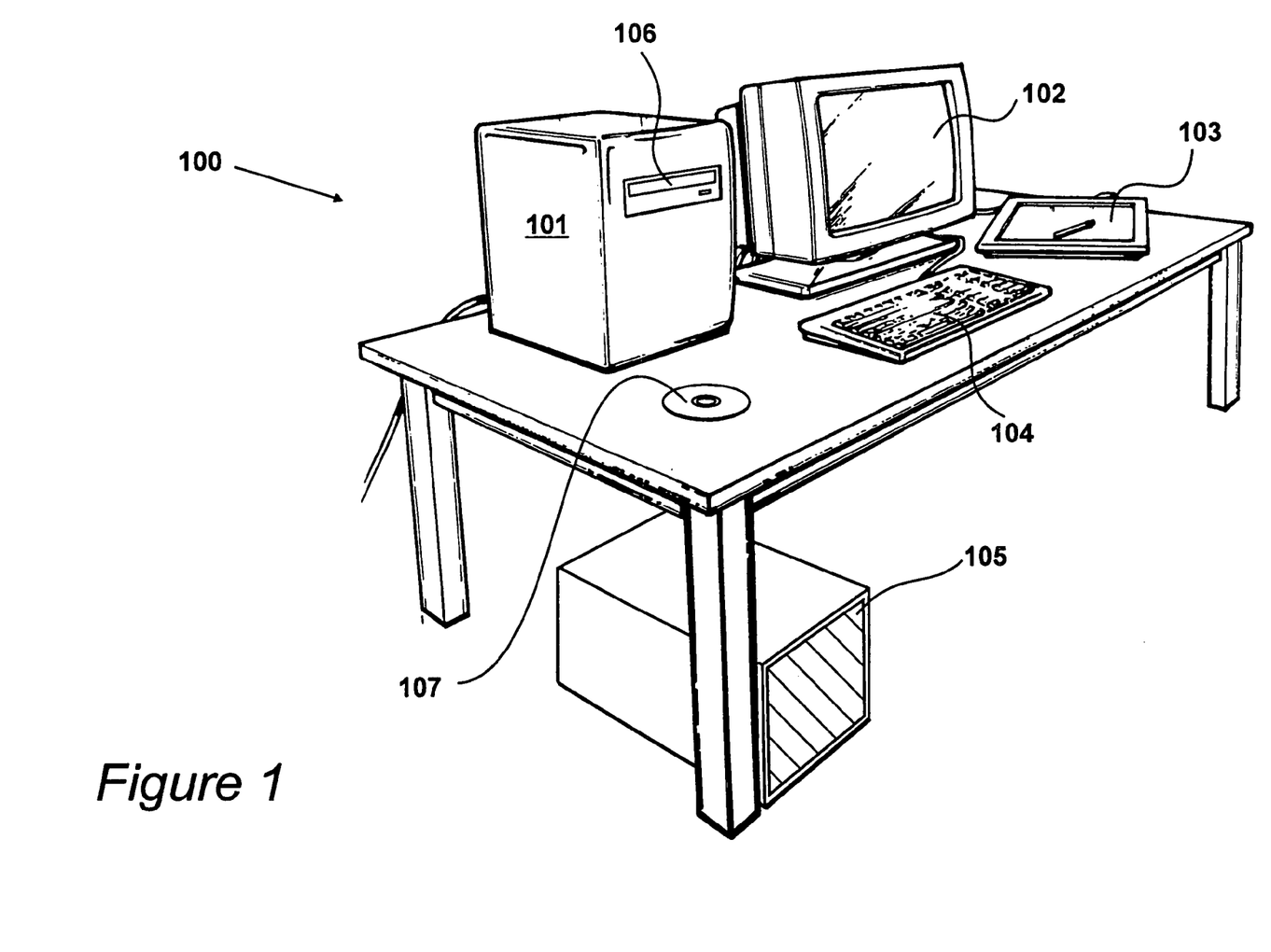
FIG. 1 shows a system 100 for editing data.

In this embodiment the data being stored is in the form of clips of frames, and so in this example data processing apparatus is provided by system 100 for editing image data, as illustrated in FIG. 1. The system is used by a human operator for editing, modifying, processing and adjusting video or film image data to form an output sequence that will eventually be stored onto digital tape. In other embodiments the data stored may be, for example, financial data, customer databases or any other type of data, and the processing system would vary accordingly.

The system comprises a computer 101 that in this example is an OCTANE™ manufactured by Silicon Graphics Inc., a monitor 102, a graphics tablet 103 to allow the user to interact with a graphical user interface presented by the monitor and a keyboard 104 to facilitate alphanumeric input.

The system 100 further comprises data storage means. In this embodiment the storage means is a disk-based frame storage system, referred to herein as a framestore 105, and in preparation for image editing, images from one or more film or video clips are transferred to the framestore 105 from a digital tape player (not shown). The digital tape player may be local to the system 100 or remote, with the transfer taking place via a network. The framestore 105 comprises several high capacity hard disk drives configured as a RAID (redundant array of independent disks), arranged to supply and store image data in parallel across several individual drives at once.

Using the framestore 105, it is possible to play back and record high resolution film images or video images at any location in a clip without having to wait for a tape wind mechanism to reach the required frame, thereby facilitating non-linear editing. Furthermore the framestore allows real time play and record of image data.

The computer 101 includes a CD-ROM drive 106, allowing program instructions to be loaded onto a hard disk within the OCTANE™, from a CD-ROM 107.

Figure 2:
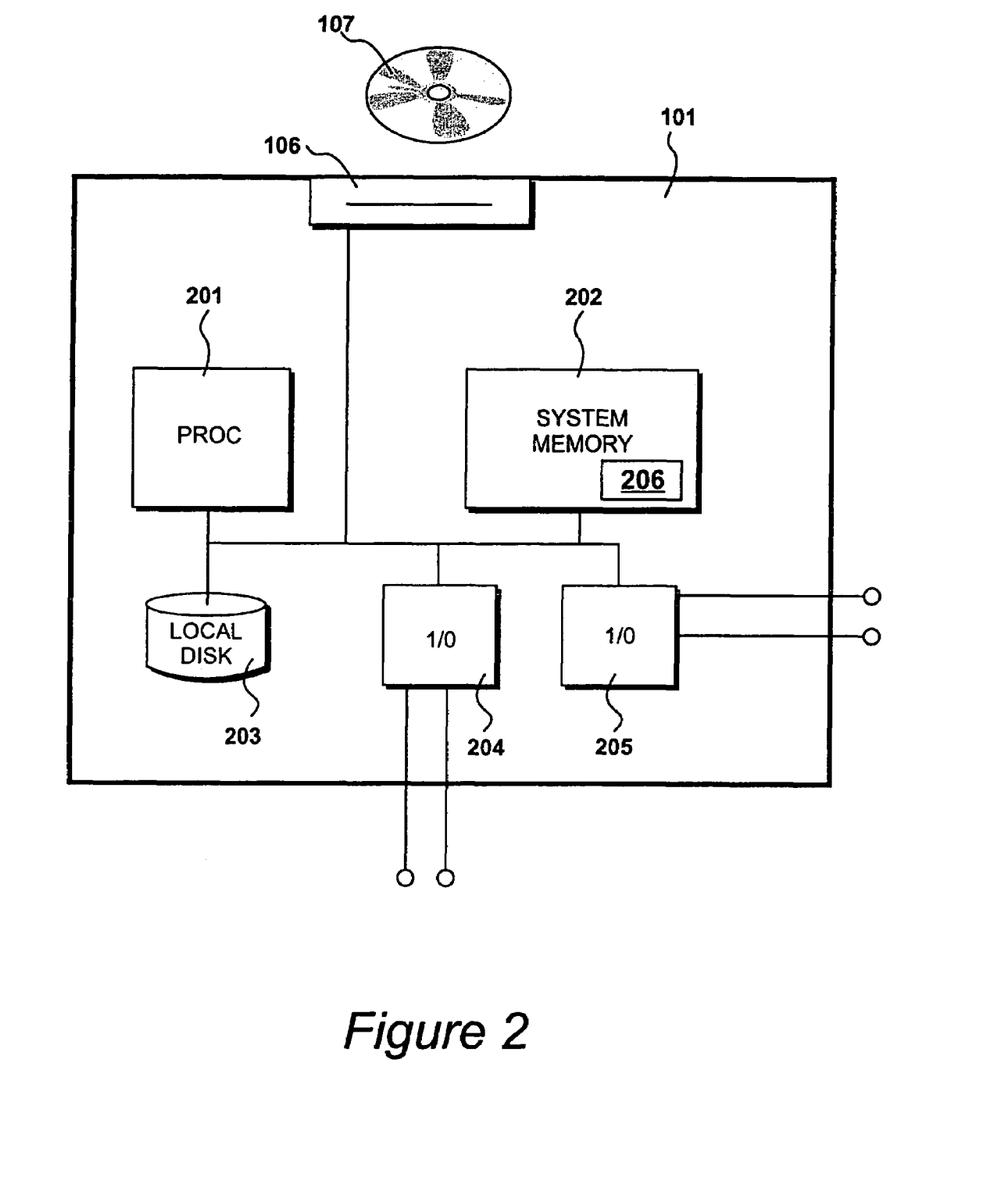
FIG. 2 shows computer 101 of FIG. 1.

FIG. 2

Computer 101 of FIG. 1 is detailed in FIG. 2. The computer includes processing means, provided in this example by one or more programmable processing devices 201 that communicate with system memory 202, a local hard disk drive 203, a first interface 204 for communicating with the framestore 105 and a second interface 205 for communicating with the keyboard 104, touch tablet 103 and stylus.

Processing device 201 operates in response to program instructions read from system memory 202. On initiation, program instructions are loaded into the system memory 202 from the local disk 203. Local disk 203 receives program instructions via data storage media such as a CD-ROM 107 receivable within a CD-ROM reader 106.

The system memory 202 contains kernel memory 206 which is reserved for the use of the operating system for computer 101 and also for data storage as herein described.

It will be appreciated that computer 101 is merely an example of a way in which processing means and memory means can be provided within data processing apparatus. Any computer capable of carrying out complex instructions and communicating with a data storage means, whether internal or external, would be suitable.

Figure 3:
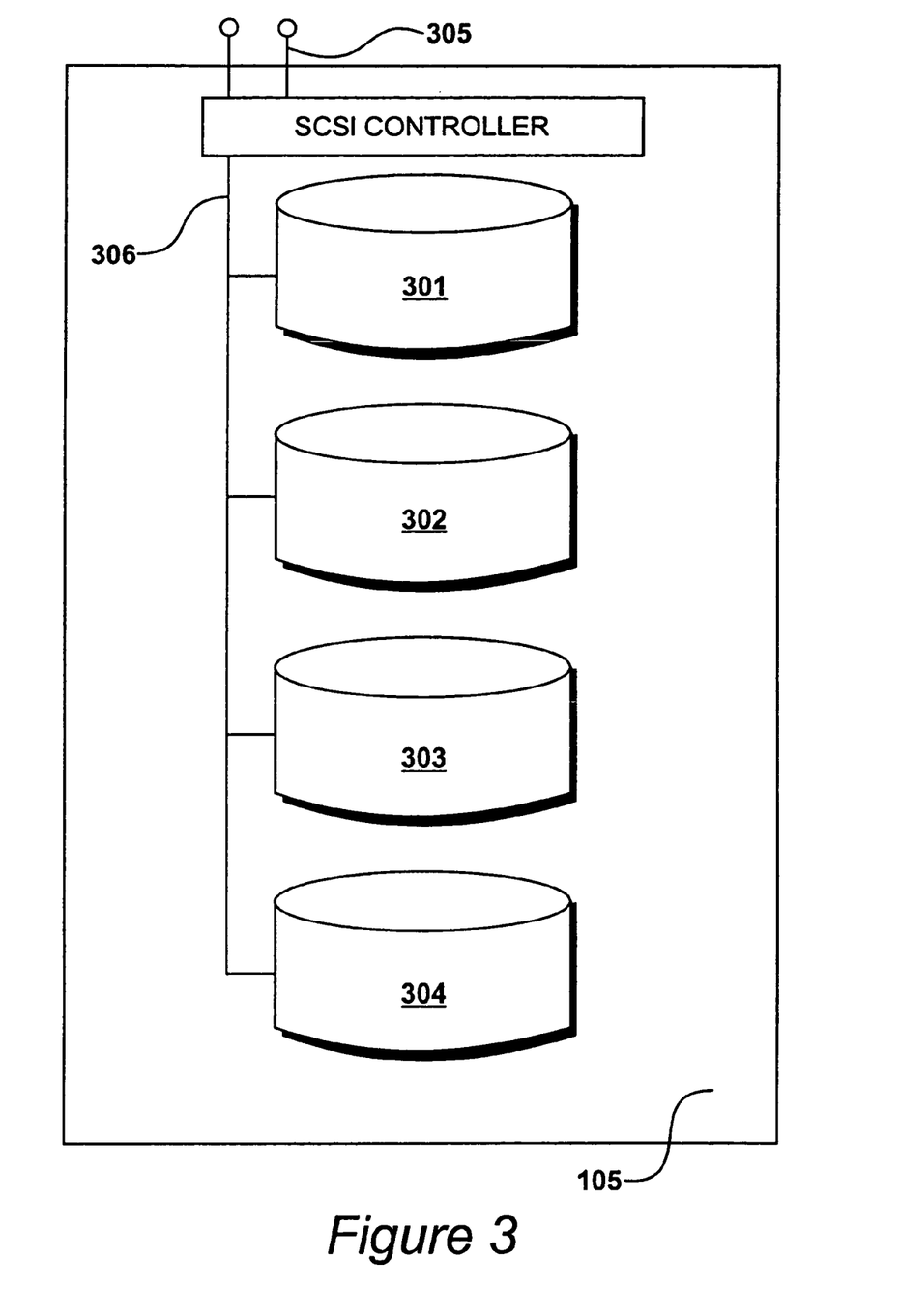
FIG. 3 shows framestore 105 of FIG. 1.

FIG. 3

Framestore 105 is detailed in FIG. 3. In this example the array has a total of four magnetic disk drives 301 to 304, each with a storage capacity of four hundred gigabytes. Image data is received from the processing system 101 and is supplied to the processing system 101 over a SCSI interface 305 or, alternatively, a fibre channel interface (not shown). Interface 305 communicates with a SCSI controller which in turn communicates with the individual drives over a channel 306.

The individual frames stored on the framestore 105 form contiguous clips, usually derived from computer animation systems, video sources or cinematographic film sources. The frames are arranged to be displayed at a particular display rate, such as thirty frames per second for NTSC, twenty-five frames per second for PAL or twenty-four frames per second for cinematographic film. Framestore 105 is therefore configured to allow these different types of frames to be transmitted at display rate or at multiples of display rate.

In addition to being displayed at different rates, and therefore requiring differing data transfer rates, the actual size of the frames also varies for different frame formats. Thus, for example, a frame of NTSC video or PAL video requires approximately one megabyte of storage space. High definition television systems require an ever-greater degree of storage capability per frame and systems capable of processing images derived from cinematographic film may yet require a greater degree of storage per frame. The system therefore needs to be configured to allow frames to be transported at selected display rates and at selected frame definitions.

The framestore is optimised by dividing each image frame into a plurality of stripes and then writing each stripe to an individual disk. In this way, data defining an image frame is distributed over three of the disks 301 to 303. In addition, a further disk 304 is required for parity data where similar bits within each stripe are XORed together to produce a parity stream that is written to the redundant disk. In this way, the loss of data from any one disk may be reconstituted by performing the XORing process for all the remaining data. Further details of such a system are given in the present Assignee's U.S. Pat. No. 6,118,931.

Figure 4:
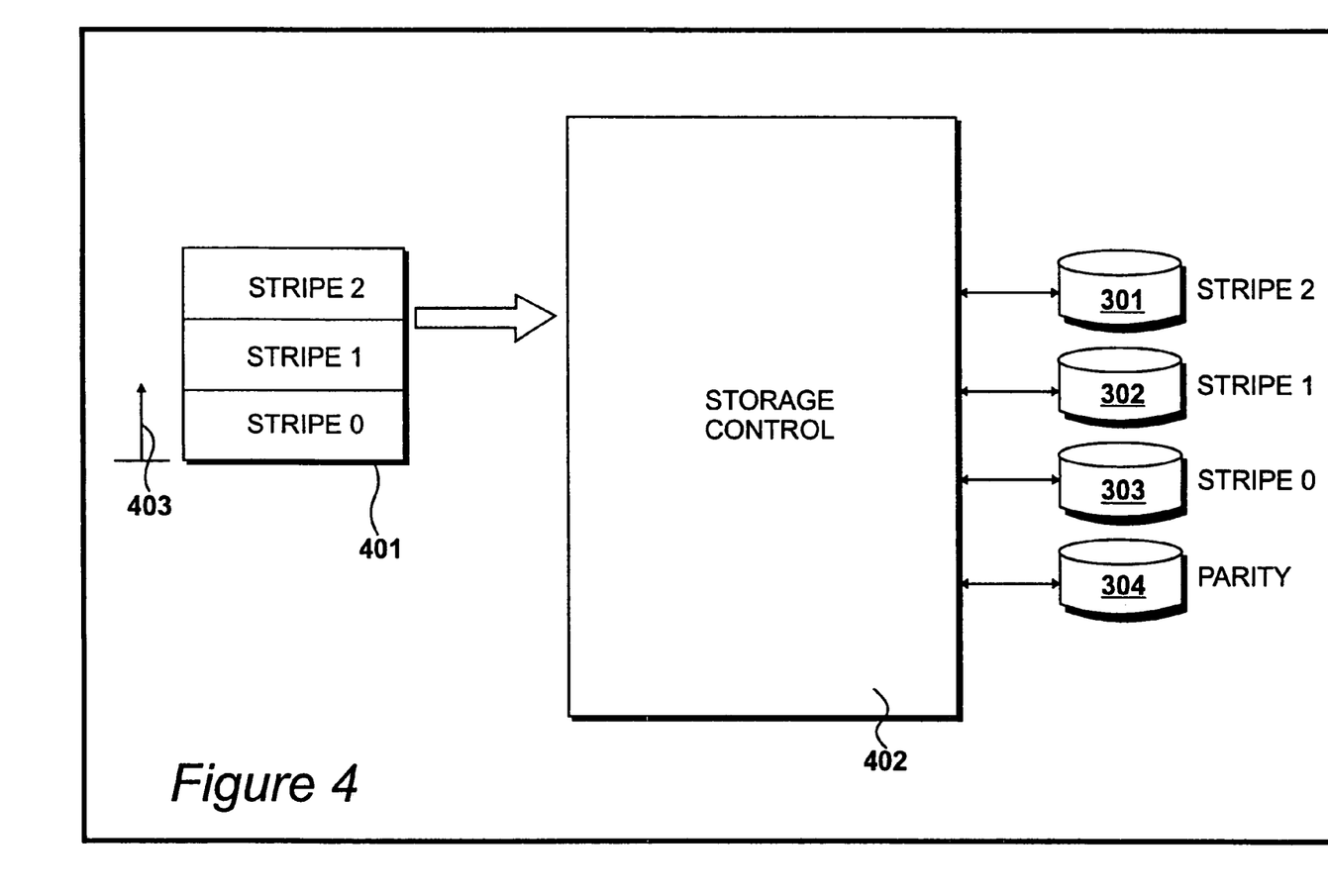
FIG. 4 shows an illustration of a striping process for storing image frames.

FIG. 4

A striping process for storing image frames is illustrated in FIG. 4. An incoming frame 401 is divided into three stripes, identified as stripe zero, stripe one, and stripe two. A storage control process 402 on framestore 105 performs an XOR operation to generate parity data and thereafter writes the data in parallel to disks 301 to 304. Thus in this example, disk 301 receives data from stripe two, disk 302 receives data from stripe one, disk 303 receives data from stripe zero, disk 304 receives the parity data. The addressing of data from the stripes may identify substantially similar locations but with the application of an appropriate off-set. Thus, data is read from stripe one at the same locations as data being read from stripe zero but with an appropriate off-set as identified by arrow 403.

Having established a system of using four disks to stripe image frames as shown in FIG. 4, applications executed by processing system 101 may access the storage means, but from the perspective of processor 201 on computer 101 the four grouped drives operate as a single logical volume.

As mentioned above, the framestore 105 is used to process image frames of various predetermined definitions and display rates. In each case, a striping process similar to that described above may be used, resulting in each frame being stored as one or more stripes on each of the disks 301 to 304. However, due to the varying quantity of data required to define images of varying definition, the lengths of the stored stripes depend upon the definition of the respective images. For example, both NTSC and PAL images may be stored using the above described process, but the NTSC images will require the storage of slightly shorter stripes than for the PAL images. Consequently, in order to store the data efficiently, image frames are stored in separate partitions on the RAID, with each partition configured to accept image data relating to image frames of a predetermined definition.

Higher definition images may also be stored using the striping process described above. However, if the image definition is too large for image data to be written to and read from the framestore at the required rate, one or more additional RAIDs similar to framestore 105 may be used. In such a case, the RAIDs are used in conjunction, such that each frame is striped across the disks of each array.

Figure 5:
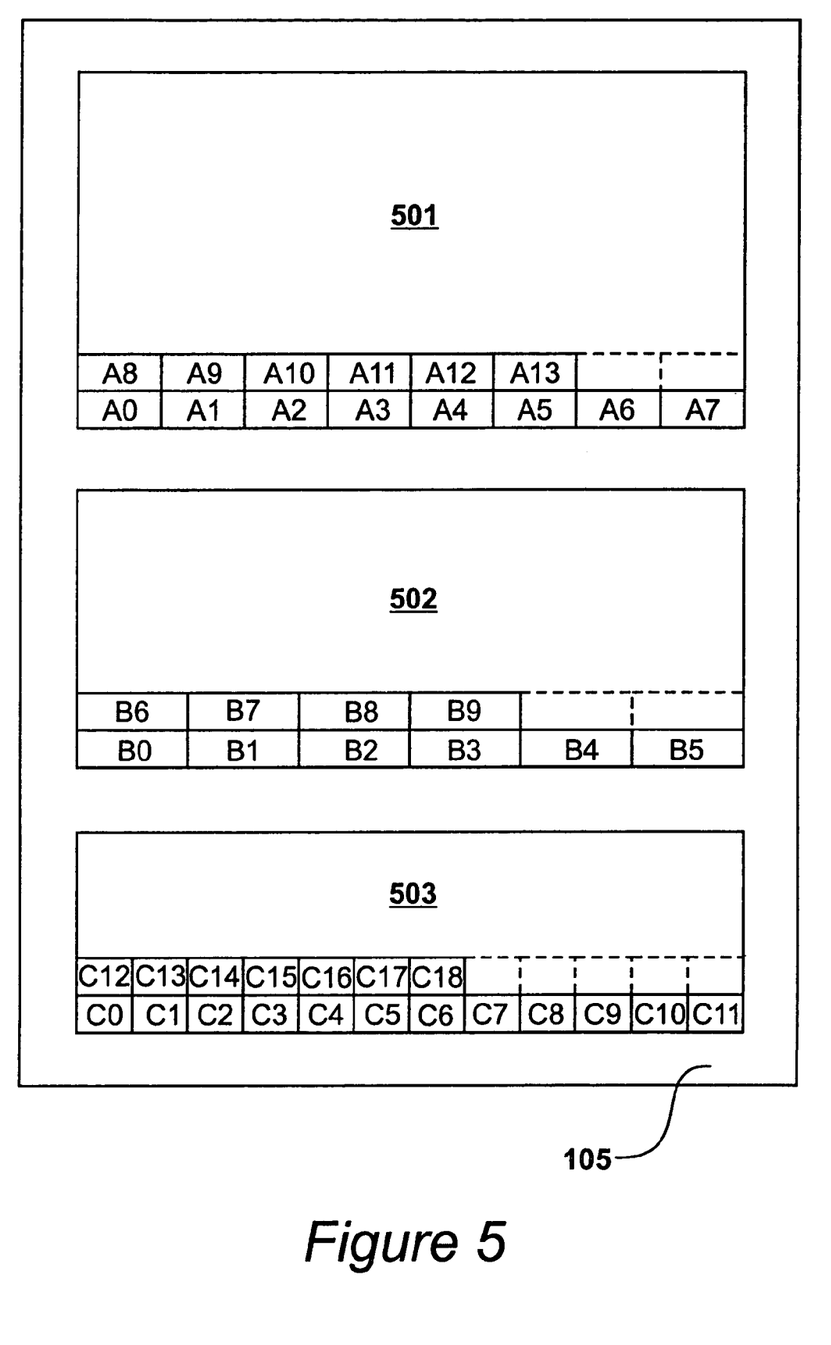
FIG. 5 shows an illustration of three partitions 501, 502 and 503 co-existing on the RAID 105.

FIG. 5

An illustration of three partitions 501, 502 and 503 co-existing on the framestore 105 is shown in FIG. 5. Each of the four disks 301 to 304 is similarly partitioned and configured to store image frames having three different defined definitions A, B and C. Consequently, partition 501 has storage elements A0, A1, A2 etc. of a first size, chosen for the efficient storage of stripes from frames of definition A, partition 502 has storage elements B0, B1, B2 etc. configured to receive stripes from frames of definition B, and partition 503 has storage elements C0, C1, C2 etc. configured to receive stripes from frames of definition C. Thus, on a request to store image frames of a particular one of said definitions, the storage process 402 writes data into the respective partition.

It should be understood that each partition, such as partition 501, extends across all disks in the framestore 105 and a data storage element, such as element A10 in partition 501, comprises four storage blocks, one on each of the four disks, with each block being at the corresponding location on each disk.

In an alternative embodiment, in which the framestore comprises two or more such RAIDs used in conjunction, a partition may extend across all disks in all of the RAIDS, or a group of disks. Thus, for example lower resolution image frames may be stored on one four-disk RAID while higher definition frames are stored on the eight disks of two RAIDs. In this embodiment, each of the partitions contains a certain number of storage elements, but the elements from some partitions comprise blocks from four disks while storage elements of the high definition partitions may contain blocks from eight or more disks. In further alternative embodiments the data may be stored on framestore 105 in other ways, for example without partitioning.

It will be appreciated that the example given here of a framestore comprising one or more RAID is a way of storing data that is particularly appropriate to image data. RAIDs are also suited to other types of large amounts of data but, dependent upon the type of data stored, the storage means may vary. For example, it may be the hard disk drive of a computer or another type of external storage device.

Figure 6:
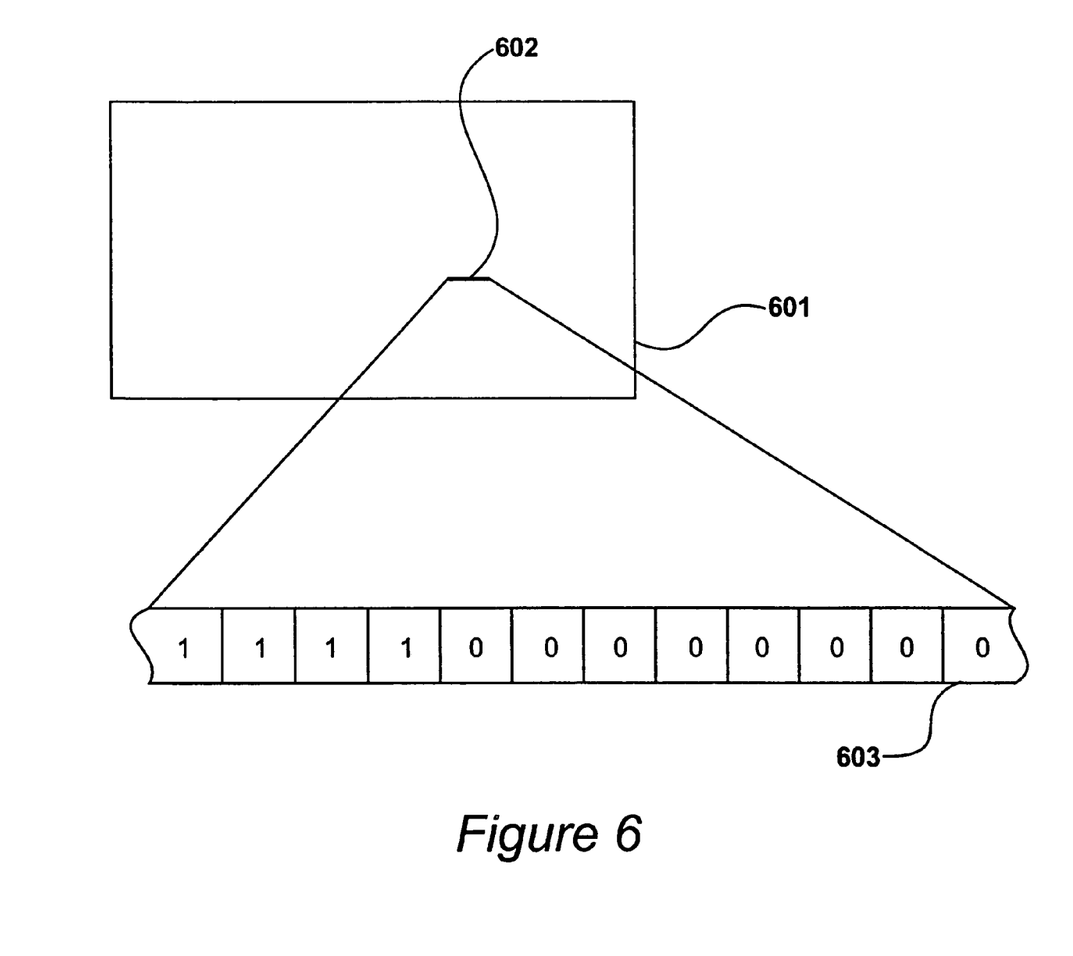
FIG. 6 shows an example of a bitmap 601 representing a partition.

FIG. 6

In order to manage the storage of image frames to the framestore 105 the processor 201 utilises usage data which is stored within kernel memory 206. The usage data stores information on whether each storage element in framestore 105 is being used or not. In this embodiment the usage data takes the form of one or more bitmap, which are arranged to represent the status of the storage elements within the partitions of the RAID. Each bit within the bitmap corresponds to just one of the storage elements, and is arranged to indicate whether or not a storage element is currently being used to store image data. Consequently, if a particular storage element is not currently being used, the corresponding bit is set to zero, and if it is being used it is set to one. In order to maintain the accuracy of the bitmap data, the processor 201 updates the bitmap as image data is written to and deleted from the framestore 105.

An example of a bitmap 601 representing a partition is shown in FIG. 6. The bitmap 601 may, for example, represent partition 501 of FIG. 5. A small section 602 of the bitmap 601 is shown as enlarged portion 603. As illustrated by the enlarged portion 603, the bitmap comprises ones and zeroes, indicating the current use or non-use respectively, of the corresponding storage element within partition 501. In this example a storage element is the space allocated to the storage of a single frame, but it will be appreciated that there are many ways of dividing up storage space and that the exact nature of a storage element will be dependent upon the type of data and the way in which it is stored. For example, when storing more traditional types of data a storage element might be a sector.

Figure 7:
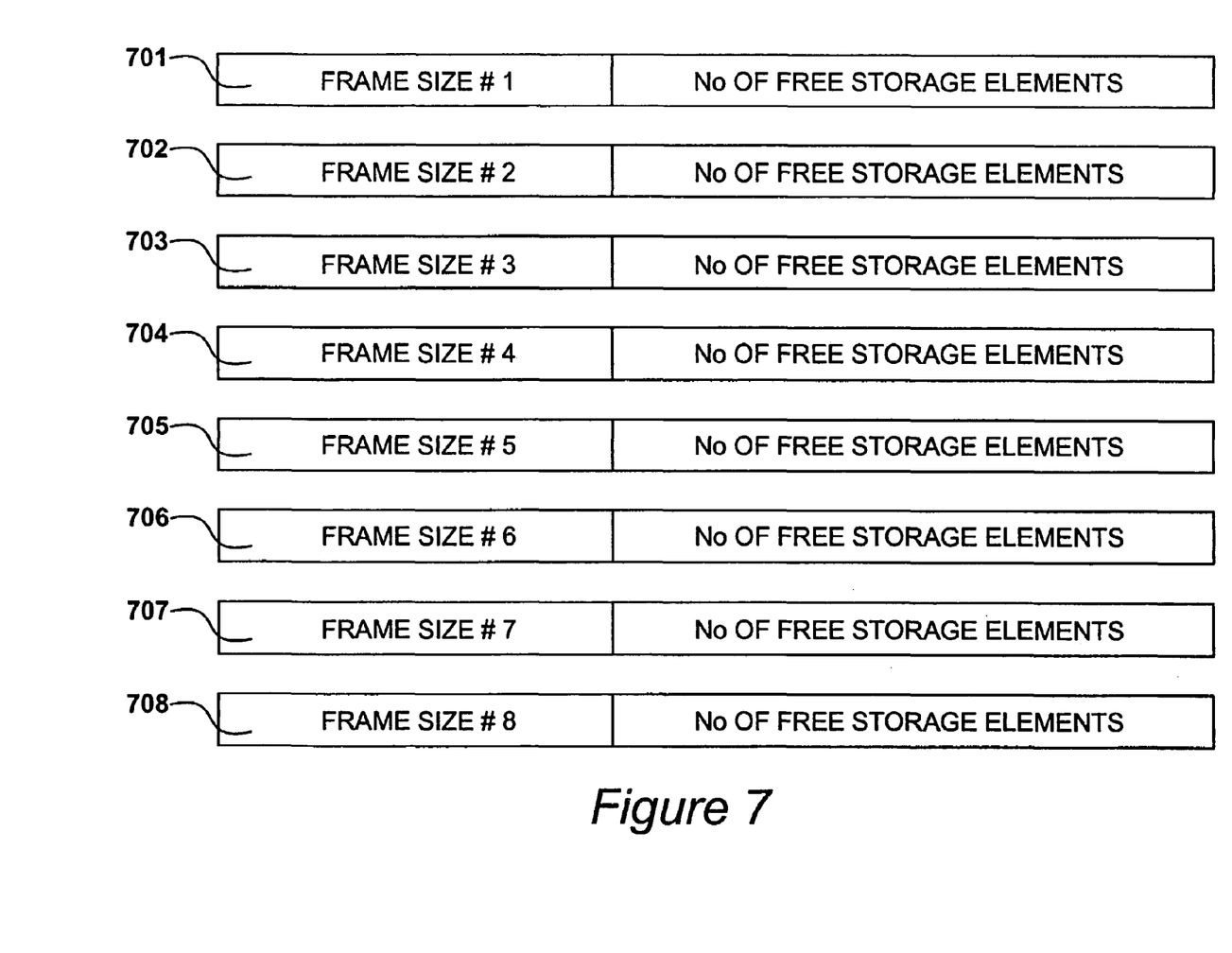
FIG. 7 illustrates eight data caches 701 to 708.

FIG. 7

A human operator of system 100 may need to process image data from many different clips, each comprising frames of one of several different predetermined image definitions. In order to edit, manipulate, etc. said clips, they are first stored onto the framestore 105.

Thus, during an editing process the processor 201 receives a plurality of requests each requesting that a clip comprising image data is to be stored on framestore 105. These requests may originate from an application run by computer 101, or in alternative embodiments from other computers connected to system 100. If the processor 201 merely passed the data to the storage control process 402 for storage, there would be a possibility that the available storage space would be filled before all data defining the clip were stored, and thus the storage process would be unsuccessful.

Therefore, before commencing the storage of a clip, the processor 201 determines whether the framestore 105 contains sufficient free storage space to store said clip. This may be done by parsing the relevant bitmap to determine how many frames of the required image definition could be stored in the partition. If it is determined that sufficient storage space exists then the clip is stored. If sufficient storage space does not exist then an appropriate message may be displayed to the user.

However, due to the large storage capacity of the framestore 105 and the correspondingly large size of the bitmap or bitmaps, the parsing process may take as much as two or three seconds.

In order to improve workflow of the system 100, the kernel memory 206 further includes eight data caches 701 to 708 inclusive, as illustrated in FIG. 7. Each of the data caches is configured to receive information regarding a frame definition, or size, and the corresponding number of storage elements which are currently available. Thus, for example, cache 701 may contain a frame definition, or size, of 1000, indicating NTSC frames and 10890, indicating that 10890 storage elements are currently not being used.

After parsing a bitmap as described above, the processor 201 stores the result to one of the caches. Consequently, if the storage request cannot be serviced, due to lack of storage space, the cached data becomes of use to further storage requests. That is, if a further request is received to store a clip of the same frame definition then, instead of parsing the bitmap, the necessary information can be read immediately from the cache, and a few seconds may be saved in processing time and human operator's time.

Thus the caches 701 to 708 provide a datastore which, when used, contain data indicating the number of image frames of a predetermined definition which may be received by non-used locations of the framestore.

It will be apparent to the skilled user that the exact nature of the datastore is dependent upon the nature of the storage elements and usage data. For example, when storing financial data it would not appropriate to have different caches for frame resolutions. It may be that a single cache is appropriate. If more than one cache is necessary then each should be configured to receive information identifying the type of data stored.

Figure 8:
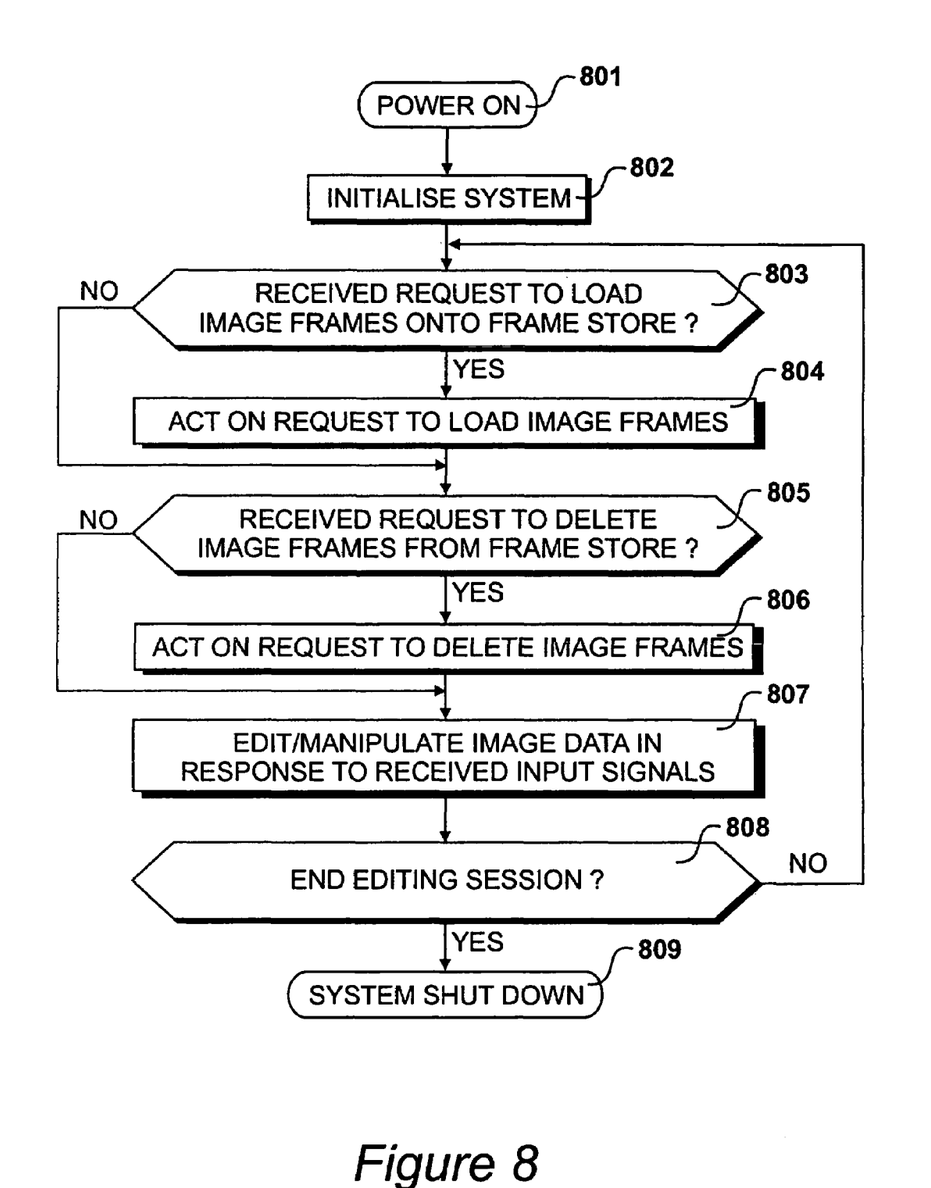
FIG. 8 shows a flow chart illustrating the operation of the system 100.

FIG. 8

A flow chart providing a simplified illustration of the operation of the system 100 is shown in FIG. 8.

Following power on at step 801, the system is initialised at step 802. During the initialisation, the operating system is booted up, hardware drivers are initialised, the editing application program is started, and bitmaps representing storage usage within the framestore 105 and the corresponding caches are initialised.

At step 803 a question is asked to determine whether a request has been received by processor 201 to load image frame data onto the framestore 105. If this question is answered in the affirmative then the request is acted upon at step 804, before step 805 is entered. A second question is asked at step 805, to determine whether a request has been received to delete image frames from the framestore. If this question is answered in the affirmative then the request is acted upon at step 806 before step 807 is entered.

At step 807 image data is edited, manipulated etc. in response to input signals received from the keyboard 104, or graphics tablet 103. At step 808 it is determined whether or not a request has been received, indicating that the editing session is to be terminated. If this question is answered in the affirmative then the system may be shut down at step 809, otherwise steps 803 to 808 are repeated.

Of course, the order in which steps 803 to 807 are performed may be varied from the flow chart of FIG. 8, which is merely intended to provide a simple example.

In this embodiment the storage control process 402 is contained within framestore 105, meaning that processor 201 receives requests to store data and, after determining whether there is enough space to store the data, it then passes the request and the data to storage control process 402. This process is responsible for the actual storage of the data, for example determining the location of available space and recording the addresses of stored data. A similar process occurs with delete requests. However other RAIDs and, indeed, other external storage systems do not include a storage control process. This is also true if the data storage means is an internal hard drive. In these cases it will be understood that the processor takes on the role of the storage control process. Additionally, in this embodiment the datastore 206 is contained within system memory 202 and is therefore maintained and interrogated by the processor 201, either by requesting the necessary information from storage control process 402 or by keeping track itself of how much information has been stored, as will be described further below. However the memory means could be provided within framestore 105, in which case it would be more appropriate for storage control process 402 to be responsible for updating the datastore. This would be particularly suitable when a storage means is accessed by more than one computer.

Figure 9:
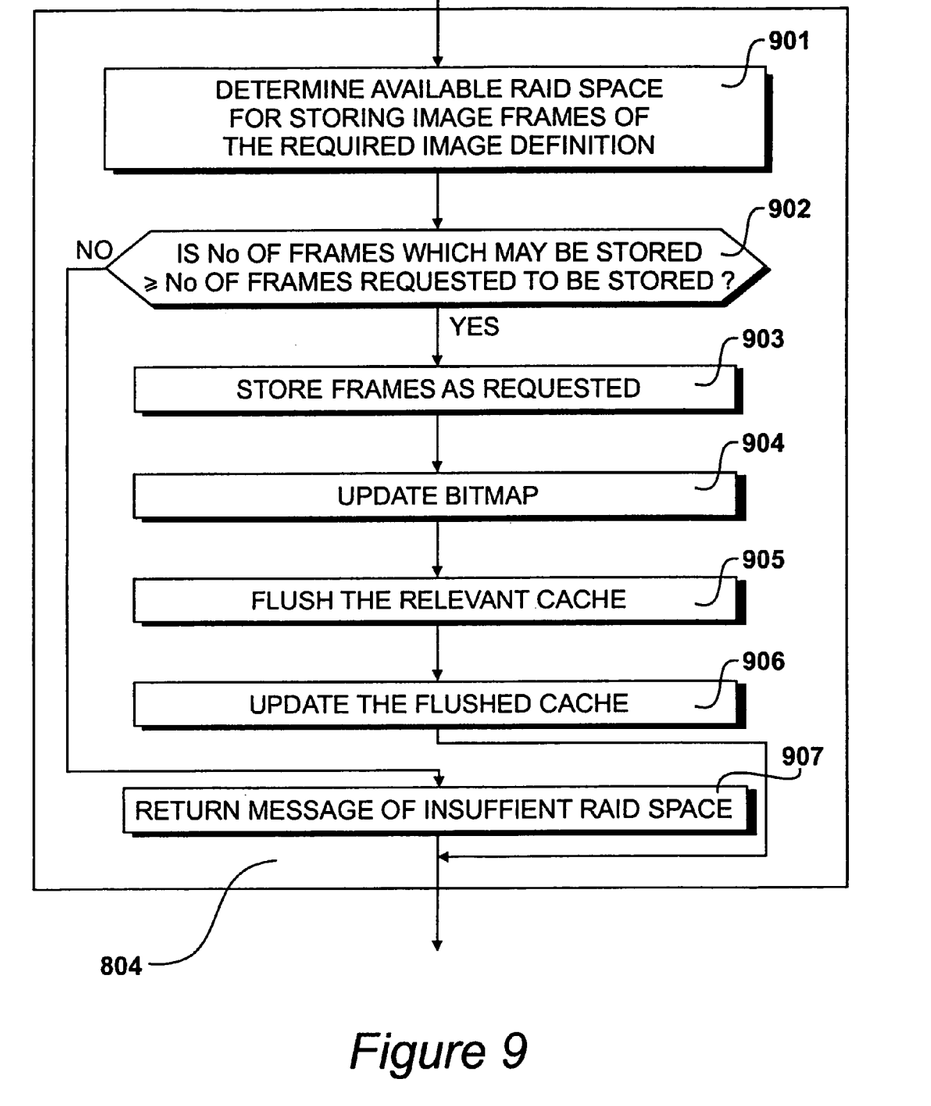
FIG. 9 shows the step 803 of acting upon a request to load image frames onto the framestore.

FIG. 9

The step 803 of acting upon a request to load image frames onto the framestore is shown in more detail in FIG. 9. At step 901, processor 201 determines the available free storage space on the framestore 105 for storing image frames of the required definition. At step 902 a question is asked to determine whether the number of frames which may be stored, as determined at step 901, is greater than or equal to the number of frames requested to be stored. If it is determined at step 902 that the framestore has insufficient storage space then an appropriate message is displayed on monitor 102 and step 804 is completed.

Alternatively, if step 902 finds that there is sufficient storage space, then at step 903 image frames are stored to the appropriate partition of the framestore 105 in accordance with the request. The relevant bitmap is updated at step 904 to reflect the changes made at step 903 to the storage space usage. At step 905 the corresponding cache 701, 702, 703, 704, 705, 706, 707 or 708 is flushed, and the flushed cache is then updated at step 906, to complete step 804.

Step 906 of updating the cache may be performed by re-parsing the relevant bitmap. Alternatively, the new cached value may be calculated from the flushed value and the number of frames stored at step 903.

Figure 10:
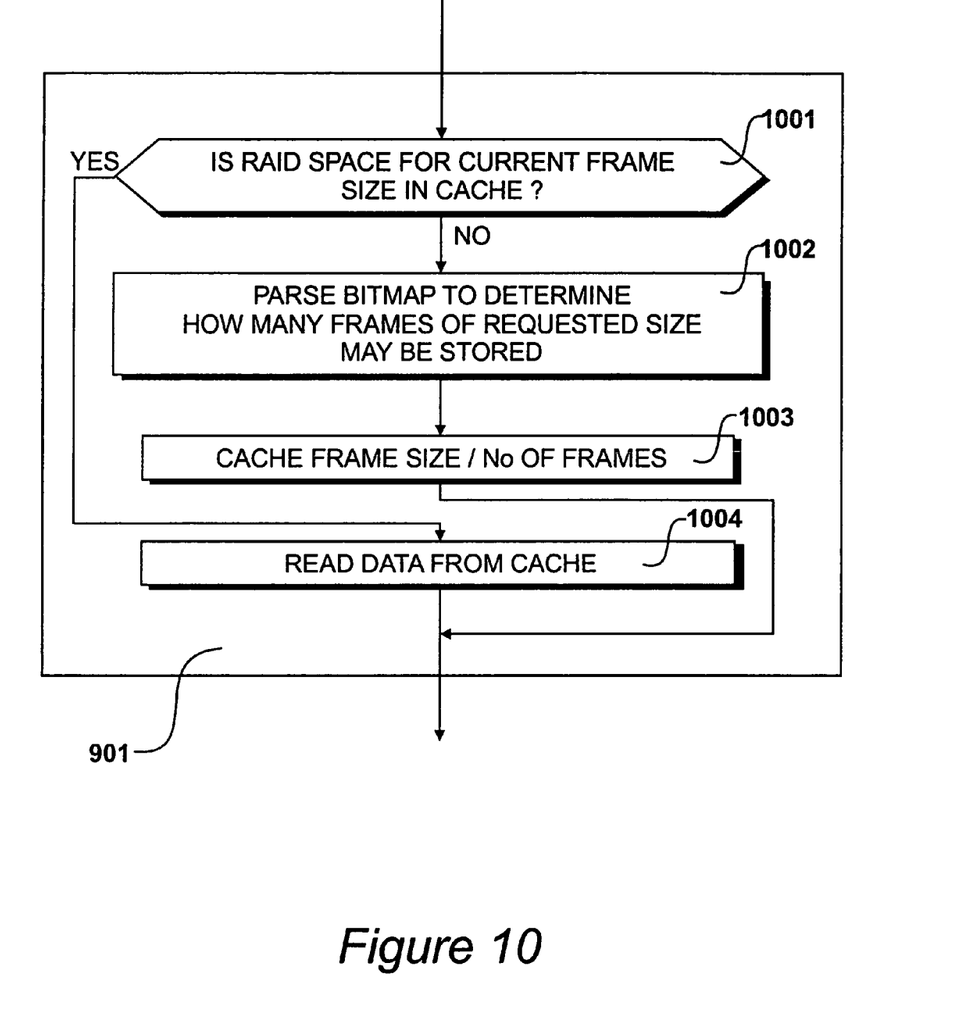
FIG. 10 shows the step 901 of determining available RAID space in further detail.

FIG. 10

The step 901 of determining available framestore space is shown in further detail in FIG. 10. At step 1001 a question is asked to determine whether the available framestore space for image frames of the required definition has already been calculated and stored within one of the eight caches. If so, then the required information is read from the relevant cache at step 1004, and step 901 is completed. Otherwise, if the question asked at step 1001 is answered in the negative, then the appropriate bitmap is parsed at step 1002 to determine how many storage elements are presently not being used, and hence how many frames of the requested image definition may be stored. The frame definition and number of frames which may be stored is then cached at step 1003 to complete step 901.

Figure 11:
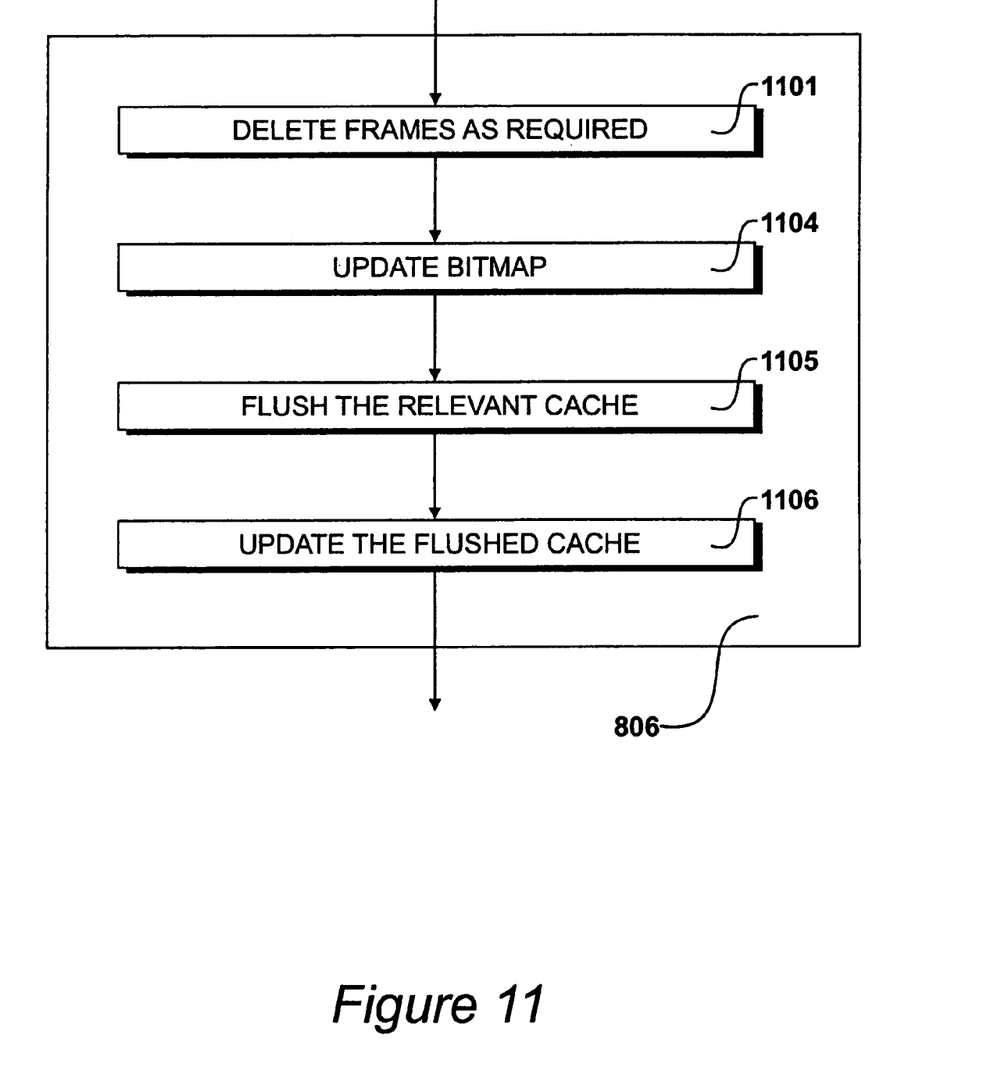
FIG. 11 shows the step 806 of acting upon a request to delete image frames from the framestore 105.

FIG. 11

The step 806 of acting upon a request to delete image frames from the framestore 105 is shown in more detail in FIG. 11. At step 1101 frames are deleted from the relevant partition of the framestore 105 by storage control process 402, in accordance with the request received at step 805. At step 1104 the bitmap corresponding to said partition is updated by processor 201, and then the corresponding cache is flushed and updated at steps 1105 and 1106 respectively. Thus steps 1104 to 1106 are, in essence, the same as steps 904 to 906.

We claim:

1. Data processing apparatus, comprising:
   (a) data storage means comprising a RAID having a plurality of partitions, and each partition comprising a plurality of defined storage elements, with each partition configured to accept image data relating to image frames of a predetermined frame definition/size;
   (b) memory means containing:
      (i) usage data indicating which of said defined storage elements contains image data of the predetermined frame definition/size; and
      (ii) multiple datastores containing information relating to the usage data;
   (c) processing means configured to:
      (i) update said usage data in response to image data being stored within said data storage means;
      (ii) in response to an update of said usage data, flush the multiple datastores and analyse said usage data to determine the number of said storage elements not containing image data;
      (iii) store information within each of said datastores, said information identifying the predetermined frame definition/size for each partition and indicating said number of storage elements in each partition not containing image data; and
      (iv) read the information from said datastore to determine whether further image data may be stored.

2. Data processing apparatus according to claim 1, wherein said data storage means comprises a hard disk.

3. Data processing apparatus according to claim 1, wherein said usage data comprises a plurality of data elements, each data element corresponding to one storage element on said data storage means.

4. Data processing apparatus according to claim 3, wherein said usage data comprises a bitmap.

5. Data processing apparatus according to claim 4, wherein said analysis of said usage data comprises parsing said bitmap.

6. Data processing apparatus according to claim 1, wherein said datastore comprises at least one cache within the kernel memory of said memory means.

7. Data processing apparatus according to claim 1, wherein each said storage element has the storage capacity to store only one of said image frames of said predetermined frame definition/size.

8. Data processing apparatus according to claim 1, wherein each of said multiple datastores comprises a cache.

9. In a data processing system comprising processing means, memory means having multiple datastores, and RAID data storage means having a plurality of defined storage elements, a method of storing data, comprising the steps of:
   storing image frames in the RAID data storage means, said RAID data storage means having a plurality of partitions, and each partition comprising a plurality of defined storage elements, with each partition configured to accept image data relating to image frames of a predetermined frame definition/size;
   storing usage data in said memory means, said usage data indicating which of said defined storage elements for each partition contains image data of the predetermined frame definition/size;
   in response to said storing of usage data, flushing the multiple datastore;
   analysing said usage data to determine the number of said storage elements not containing image data;
   storing information within each of said datastores, said information identifying the predetermined frame definition/size for each partition and indicating said number of storage elements in each partition not containing image data; and
   reading the information from said datastore to determine whether further image data may be stored.

10. A method according to claim 9, wherein said data storage means comprises a hard disk.

11. A method according to claim 9, wherein said usage data comprises a plurality of data elements, each data element corresponding to one storage element on said data storage means.

12. A method according to claim 11, wherein said usage data comprises a bitmap.

13. A method according to claim 12, wherein said step of analysing said usage data comprises parsing said bitmap.

14. A method according to claim 9, wherein said datastore comprises at least one cache within the kernel memory of said memory means.

15. A method according to claim 9, wherein each said storage element has the storage capacity to store only one of said image frames of said predetermined frame definition/size.

16. A method according to claim 9, wherein each of said multiple datastores comprises a cache.

17. A computer-readable medium having computer-readable instructions executable by a computer such that, when executing said instructions, a computer will perform the steps of:
 storing data within data storage means comprising a RAID having a plurality of partiions, and each partition comprising a plurality of defined storage elements, with each partition configured to accept image data relating to image frames of a predetermined frame definition/size;
 storing usage data, said usage data indicating which of said storage elements is currently being used in the predetermined frame definition/size;
 in response to data being stored within said data storage means, updating said usage data;
 in response to said updating said usage data, flushing multiple data stores;
 analysing said usage data to determine the number of said storage elements not containing image data;
 storing information within each of said multiple datastores, said information identifying the predetermined frame definition/size for each partition and indicating said number of storage elements in each partition not containing image data; and
 reading said information from said datastore to determine whether further image data may be stored.

18. A computer-readable medium having computer-readable instructions executable by a computer according to claim 17, wherein said data storage means comprises a hard disk.

19. A computer-readable medium having computer-readable instructions executable by a computer according to claim 17, wherein said usage data comprises a plurality of data elements, each data element corresponding to one storage element on said data storage means.

20. A computer-readable medium having computer-readable instructions executable by a computer according to claim 19, wherein said usage data comprises a bitmap.

21. A computer-readable medium having computer-readable instructions executable by a computer according to claim 20, wherein said step of analysing said usage data comprises parsing said bitmap.

22. A computer-readable medium having computer-readable instructions executable by a computer according to claim 17, wherein each said storage element has the storage capacity to store only one of said image frames of said predetermined frame definition/size.

23. A computer-readable medium having computer-readable instructions executable by a computer according to claim 17, wherein each of datastores comprises cache.

24. A computer system programmed to execute stored instructions such that in response to said stored instructions said system is configured to:
 store data within data storage means comprising a RAID having a plurality of partitions, and each partition comprising a plurality of defined storage elements, with each partition configured to accept image data relating to image frames of a predetermined frame definition/size;
 store usage data, said usage data indicating which of said storage elements contains image data in the predetermined frame definition/size;
 in response to data being stored within said data storage means, update said usage data;
 in response to said update of said usage data, flushing multiple datastores;
 analyse said usage data to determine the number of said storage elements not containing image data;
 store information within each of said multiple datastores, said information identifying the predetermined frame definition/size for each partition and indicating said number of storage elements not containing image data;
 read said information from said datastore to determine whether said further image data may be stored.

25. A computer system according to claim 24, wherein said data storage means comprises a hard disk.

26. A computer system according to claim 24, wherein said usage data comprises a plurality of data elements, each data element corresponding to one storage element on said data storage means.

27. A computer system according to claim 24, wherein said usage data comprises a bitmap.

28. A computer system according to claim 27, wherein said step of analysing said usage data comprises parsing said bitmap.

29. A computer system according to claim 24, wherein said datastore comprises at least one cache within the kernel memory of said computer system.

30. A computer system according to claim 24, wherein each said storage element has the storage capacity to store only one of said image frames of said predetermined frame definition/size.

31. A computer system according to claim 24, wherein each datastore comprises a cache.

* * * * *